(12) United States Patent
Hsu

(10) Patent No.: US 8,048,401 B2
(45) Date of Patent: Nov. 1, 2011

(54) COMPOSITION FOR HYDROGEN GENERATION

(75) Inventor: Shih-Ying Hsu, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 781 days.

(21) Appl. No.: 12/156,687

(22) Filed: Jun. 4, 2008

(65) Prior Publication Data

US 2008/0305035 A1   Dec. 11, 2008

Related U.S. Application Data

(60) Provisional application No. 60/933,239, filed on Jun. 5, 2007.

(51) Int. Cl.
  *C01B 3/08* (2006.01)
  *C09K 3/00* (2006.01)
(52) U.S. Cl. .................. 423/657; 423/648.1; 252/182.1; 252/188
(58) Field of Classification Search .................. 423/657; 252/188
See application file for complete search history.

(56) References Cited

U.S. PATENT DOCUMENTS

| | | |
|---|---|---|
| 5,372,617 A | 12/1994 | Kerrebrock et al. |
| 5,514,353 A | 5/1996 | Adlhart |
| 6,790,416 B2 | 9/2004 | Mann et al. |
| 6,866,689 B2 | 3/2005 | Lumsden et al. |
| 2002/0088178 A1 | 7/2002 | Davis |
| 2004/0258966 A1 | 12/2004 | Mann et al. |
| 2006/0196112 A1* | 9/2006 | Berry et al. ............... 44/550 |
| 2007/0020172 A1 | 1/2007 | Withers-Kirby et al. |
| 2007/0187636 A1 | 8/2007 | Yamamoto |
| 2007/0189960 A1 | 8/2007 | Yamamoto |

FOREIGN PATENT DOCUMENTS

| | | |
|---|---|---|
| WO | WO 98/30493 | 7/1998 |
| WO | WO 2007/019690 | 2/2007 |

* cited by examiner

*Primary Examiner* — Melvin Mayes
*Assistant Examiner* — Jun Li
(74) *Attorney, Agent, or Firm* — Kenneth Crimaldi

(57) ABSTRACT

A solid composition containing: (a) at least one metal hydride compound; (b) at least one borohydride compound; and (c) at least one of: (i) a transition metal halide, or (ii) a transition metal boride. A "metal hydride" is a compound containing only one metal and hydrogen, including, e.g., alkali and alkaline earth metal hydrides. A "borohydride compound" is a compound containing the borohydride anion, $BH_4^-$.

19 Claims, No Drawings

COMPOSITION FOR HYDROGEN GENERATION

This application claims the benefit of priority under 35 U.S.C. §119(e) of U.S. Provisional Patent Application No. 60/933,239 filed on Jun. 5, 2007.

This invention relates to a solid borohydride-containing formulation useful for hydrogen generation in fuel cells.

Borohydride-containing compositions are known as hydrogen sources for hydrogen fuel cells, usually in the form of aqueous solutions. Solid borohydride-containing compositions also have been used. The borohydride-containing compositions are used to generate hydrogen via hydrolysis initiated by a pH change or contact with a catalyst For example, WO 1998/30493 discloses a composition containing solid sodium borohydride, up to 50% of a simple metal hydride, and a transition metal catalyst. However, some typical problems encountered in hydrogen generation are not addressed by this reference, e.g., rapid start and stop, efficient use of fuel, and management of hydrolysis reaction product.

The problem addressed by this invention is to find a solid formulation of borohydride that better addresses the aforementioned problems.

STATEMENT OF INVENTION

The present invention provides a solid composition. The composition comprises: (a) from 52% to 80% by weight of at least one metal hydride compound; (b) from 15% to 42% by weight of at least one borohydride compound; and (c) from 1% to 15% by weight of at least one of: (i) a transition metal halide, and (ii) a transition metal boride.

The present invention further provides a method for generating hydrogen. The method comprises steps of: (a) providing a solid composition comprising: (i) from 52% to 80% by weight of at least one metal hydride compound; (ii) from 15% to 42% by weight of at least one borohydride compound; and (iii) from 1% to 15% by weight of at least one of: (1) a transition metal halide, and (2) a transition metal boride; wherein the solid composition is supported on a flexible substrate material; and (b) adding water from a water source to the flexible substrate material with relative motion between the water source and the flexible substrate material.

The present invention further provides an alternative solid composition. The composition comprises: (a) from 15% to 70% by weight of at least one borohydride compound; (b) from 15% to 80% by weight of at least one metal hydride compound; (c) from 1% to 12% by weight of at least one catalyst selected from: (i) a transition metal halide, and (ii) a transition metal boride; and (d) from 3% to 25% by weight of at least one metal hydroxide or alkoxide.

DETAILED DESCRIPTION

Percentages are weight percentages and temperatures are in ° C., unless specified otherwise. An "organic acid" is an acidic compound, i.e., one with a $pK_a$<6, which contains carbon and hydrogen. A "borohydride compound" is a compound containing the borohydride anion, $BH_4^-$. A "metal hydride" is a compound containing only one metal and hydrogen, including, e.g., alkali and alkaline earth metal hydrides.

In some embodiments of the solid composition, the amount of metal hydride compound(s) is at least 53%, alternatively at least 54%, alternatively at least 55%, alternatively at least 58%, alternatively at least 60%; the amount of metal hydride compound(s) is no more than 78%, alternatively no more than 75%, alternatively no more than 70%. In some embodiments of the invention, the metal hydride compound is a metal salt which has a metal cation from groups 1, 2, 4, 5, 7, 11, 12 or 13 of the periodic table, or a mixture thereof. In some embodiments of the invention, the metal hydride compound is an alkali or alkaline earth metal hydride or combination thereof; alternatively it comprises lithium hydride, sodium hydride or a mixture thereof.

In some embodiments of the solid composition, the amount of borohydride compound(s) is at least 18%, alternatively at least 20%, alternatively at least 25%, alternatively at least 28%; the amount of borohydride compound(s) is no more than 40%, alternatively no more than 38%, alternatively no more than 35%, alternatively no more than 33%. In some embodiments of the invention, the borohydride compound is a metal salt which has a metal cation from groups 1, 2, 4, 5, 7, 11, 12 or 13 of the periodic table, or a mixture thereof. In some embodiments of the invention, the borohydride compound is an alkali or alkaline earth metal borohydride or combination thereof, alternatively it comprises sodium borohydride (SBH), potassium borohydride, lithium borohydride or a mixture thereof, alternatively sodium borohydride.

In some embodiments of the solid composition, the amount of transition metal halide and/or boride is at least 2%, alternatively at least 3%, alternatively at least 4%, alternatively at least 5%; the amount of transition metal halide and/or organic acid is no more than 12%, alternatively no more than 10%, alternatively no more than 9%, alternatively no more than 7%. In some embodiments of the invention, a transition metal halide and/or boride is a halide of a transition metal such as Co, Ru, Ni, Fe, Rh, Pd, Os, Ir, Pt, or mixtures thereof, and/or a boride of Co and/or Ni.

In some embodiments of the alternative solid composition, the amount of borohydride compound(s) is at least 20%, alternatively at least 25%, alternatively at least 30%, alternatively at least 35%, alternatively at least 40%; the amount of borohydride compound(s) is no more than 65%, alternatively no more than 60%, alternatively no more than 55%, alternatively no more than 50%, alternatively no more than 40%.

In some embodiments of the alternative solid composition, the amount of metal hydroxide(s) and/or alkoxide(s) is at least 4%, alternatively at least 5%, alternatively at least 6%, alternatively at least 8%, alternatively at least 10%; the amount of metal hydroxide(s) and/or alkoxide(s) is no more than 20%, alternatively no more than 18%, alternatively no more than 16%. In some embodiments, the metal hydroxide or alkoxide is an alkali metal hydroxide or combination thereof, alkali metal alkoxide or alkaline earth alkoxide or combination thereof; alternatively it is an alkali metal hydroxide or sodium or potassium methoxide, or mixture thereof, alternatively sodium, lithium or potassium hydroxide or sodium or potassium methoxide, or a mixture thereof, alternatively sodium hydroxide or potassium hydroxide; alternatively sodium hydroxide. More than one alkali metal borohydride and more than one metal hydroxide or alkoxide may be present. Preferably the alkoxide is a $C_1$-$C_4$ alkoxide.

In some embodiments of the alternative solid composition, the amount of metal hydride compound(s) is at least 18%, alternatively at least 20%, alternatively at least 25%, alternatively at least 30%, alternatively at least 35%, alternatively at least 40%; the amount of metal hydride compound(s) is no more than 65%, alternatively no more than 60%, alternatively no more than 55%, alternatively no more than 50%, alternatively no more than 40%. Preferably, the metal hydride compound is a metal salt which has a metal cation from groups 1, 2, 4, 5, 7, 11, 12 or 13 of the periodic table, or a mixture thereof. In some embodiments, the metal hydride compound is an alkali or alkaline earth metal hydride or combination thereof; alternatively it comprises lithium hydride, sodium hydride or a mixture thereof.

In some embodiments of the alternative solid composition, the amount of transition metal halide and/or boride is at least 2%, alternatively at least 3%, alternatively at least 4%, alternatively at least 5%; the amount of transition metal halide and/or organic acid is no more than 9%, alternatively no more than 8%, alternatively no more than 7%.

The present invention is also directed to a method for generation of hydrogen. The solid composition (fuel) can be coated as a thin layer on one side of the flexible substrate, which in some embodiments is a porous material, preferably one which is hydrophilic. The fuel can be coated linearly, or in any desired shape or pattern, on the substrate. The water can be delivered from the other side of the flexible substrate, which preferably does not have any fuel coating. The delivery of water can be made via a metering device which can be switched on or off on demand. As the said liquid accelerator comes in contact with the flexible substrate, it "wets" the pathway of the metering device. The wetness can diffuse or penetrate immediately to the other side of the flexible substrate to trigger hydrolysis. Consequently, hydrogen is generated from the coated side according to demand. The start/stop can be easily controlled by the on/off switch of the metering device connected to a central preprogrammed computer chip. Hydrogen will not be generated when the metering device is off. Relative motion between the water source and the flexible substrate ensures that different portions of the fuel coating will be reacting with water as it is added. In some embodiments, the water source moves and the flexible film is stationary, in some embodiments, the film moves and the water source is stationary, and in some embodiments, both move. The film or water source may move linearly or in patterns designed to contact all of the fuel with water eventually. For example, the flexible substrate coated with fuel can be rolled onto a roller from which it is unrolled gradually to expose fresh coating to the water source. The water source may be stationary, or may move transverse to the direction of the film motion so as to wet the full width of the coating. Foaming problems in this design will be minimal because fresh fuel coating is always being used. In some embodiments, water is added in the form of a solution comprising acids and/or catalysts. This method may also be used with the alternative solid composition as a fuel.

In some embodiments, the flexible substrate includes any hydrophilic materials such as fibers, celluloses, paper products, etc. They can be in any shapes, not only limited to round, triangle, rectangular, etc. They can be in any thickness and color. Known coating techniques can be applied, preferably to create an even and homogeneous coating on the surface of the flexible substrate. A hydrophilic adhesive can be used to supply adhesion to the solid fuel. The metering device that delivers a liquid accelerator can be powered by self-generating electricity or mechanically by a specially-designed spring.

The fuel compositions of this invention can be coated as a single layer or multiple layers on the flexible substrate. The coating can comprise any given fuel composition in one layer or a combination of many layers, each of which contains a single component of a fuel composition. Any kind of binder can be used to help fuel mixture or components binding to the flexible substrate as long as they do not affect the desirable performance of any given fuel composition. The liquid accelerator in the metering device can be water or water with an acid and/or a transition metal halide or boride catalyst. In some embodiments, an acid is present in an amount from 2 wt % to 50 wt %, alternatively from 10 wt % to 45 wt %, alternatively from 15 wt % to 40 wt %. In some embodiments, a transition metal halide or boride catalyst is present in an amount from 1 wt % to 30 wt %, alternatively from 2 wt % to 25 wt %, alternatively from 2 wt % to 20 wt %.

When the water contains an acid, the acid is an organic acid and/or an inorganic acid. In one embodiment of the invention, the acid is an organic acid. Preferably, an organic acid is a carboxylic acid. In one embodiment of the invention, the organic acid is a $C_2$-$C_5$ dicarboxylic acid, a $C_2$-$C_5$ hydroxy carboxylic acid, a $C_2$-$C_5$ hydroxy dicarboxylic acid or a combination thereof. More than one organic acid may be present in the aqueous solution. Especially preferred organic acids include malic acid, citric acid, tartaric acid, malonic acid and oxalic acid. In another embodiment of the invention, the acid is an inorganic acid. Preferably, the inorganic acid is a concentrated mineral acid, e.g., hydrochloric acid, sulfuric acid and/or phosphoric acid. Preferably the inorganic acid is not nitric acid or another strongly oxidizing acid. More than one inorganic acid may be present in the aqueous solution. Both organic and inorganic acids may be present in the aqueous solution.

The solid compositions of this invention may be in any convenient form. Examples of suitable solid forms include powder and granules. Preferably, powders have an average particle size less than 80 mesh (177 μm). Preferably, granules have an average particle size from 10 mesh (2000 μm) to 40 mesh (425 μm).

Preferably, the water content of the solid compositions is no more than 0.5%, alternatively no more than 0.2%, alternatively no more than 0.1%. Preferably, the solid compositions contain less than 20% of anything other than the borohydride compound and the base, alternatively less than 15%, alternatively less than 10%, alternatively less than 5%. Other possible constituents of the solid compositions include, e.g., catalysts, acids, anti-foam agents, disintegrants and surfactants. Suitable disintegrants include, e.g., silica, alumina, sand, ion-exchange resins, porous polymers, metal powders, cotton, fiber cotton, guar gum, xanthan gum, barite, bentonite, silicates, polyacrylamides, mineral oils, lubricants, etc. The amount of disintegrants can vary from 0.1% to 20%, alternatively 0.2% to 15%, alternatively 0.5% to 10%. Anti-foam agents can be silicone-containing or non-silicone-containing defoamers in amounts from 0.1% to 20%, alternatively 0.3-15%, alternatively 0.5-10%.

EXAMPLES

Example 1

(Composition A)

(Comparative by Temperature Cycle Experiment)

Fuel (caplet): Commercial sodium borohydride caplet (~1.0 g in weight);
Accelerator solution: 25 wt. % malic acid in DI water.

Example 2

(Composition B)

(Comparative by Temperature Cycle Experiment)

Fuel (powder): 95 wt. % sodium borohydride+5 wt. % NaOH;
Accelerator solution: 25 wt. % malic acid in DI water.

Example 3

(Composition C)

(Comparative by Temperature Cycle Experiment)

Fuel (caplet): Commercial sodium borohydride caplet (~1.0 g in weight);
Accelerator solution: 10 wt. % $CoCl_2$ in DI water.

Example 4

(Composition D)

(Comparative by Temperature Cycle Experiment)

Fuel (powder): LiH/SBH/$CoCl_2$, 20/74/6 (all in weight %);
Accelerator solution: DI water.

Example 5

(Composition E)

(Comparative by 60° C. Stability Test)

Fuel (powder): LiH/SBH/$CoCl_2$, 50/44/6 (all in weight %);
Accelerator solution: DI water.

Example 6

(Composition F)

(By 60° C. Stability Test)

Fuel (powder): LiH/SBH/$CoCl_2$, 55/39/6 (all in weight %);
Accelerator solution: DI water.

Example 7

(Composition G)

(By 60° C. Stability Test)

Fuel (powder): LiH/SBH/$CoCl_2$, 60/34/6 (all in weight %);
Accelerator solution: DI water

Example 8

(Composition H)

(By 60° C. Stability Test)

Fuel (powder): LiH/SBH/$CoCl_2$, 74/20/6 (all in weight %);
Accelerator solution: DI water

Example 9

(Composition I)

(By 60° C. Stability Test)

Fuel (powder): LiH/SBH/$CoCl_2$, 60/37/3 (all in weight %);
Accelerator solution: DI water

Example 10

(Composition J)

(By 60° C. Stability Test)

Fuel (powder): LiH/SBH/$CoCl_2$, 60/30/10 (all in weight %);
Accelerator solution: DI water

Example 11

(Composition K)

(By 60° C. Stability Test)

Fuel (powder): LiH/SBH/KOH/$CoCl_2$, 20/60/14/6 (all in weight %);
Accelerator solution: DI water.

Example 12

(Composition L)

(By 60° C. Stability Test)

Fuel (powder): LiH/SBH/KOH/$CoCl_2$, 50/30/14/6 (all in weight %);
Accelerator solution: DI water.

TABLE 1

Fuel Performance Data for Compositions A-L

| | First 5 s $H_2$ Vol.$^a$, ml | Stop Vol.$^b$, ml | Stop Time$^c$, seconds | Latent $H_2{}^d$, % | $H_2$, yield$^e$, wt. % | Max. Foam Height$^f$, mm |
|---|---|---|---|---|---|---|
| A | 61 | 88 | 240 | 34.8 | 3.0 | 66 |
| B | 65 | 78 | 450 | 19.6 | 3.0 | 79 |
| C | 19 | — | No stop time | 54 | 4.0 | — |
| D | 111 | 180 | 540 | 10.9 | ND | ND |
| E | 125 | 181 | 180 | 6.0 | ND | 35 |
| F | 145 | 178 | 90 | 4.6 | ND | ND |
| G | 141 | 177 | 180 | 1.8 | 5.0 | 20 |
| H | 137 | 182 | 90 | 3.3 | ND | ND |
| I | 127 | 191 | 90 | 2.8 | ND | ND |
| J | 147 | 194 | 90 | 3.1 | ND | ND |
| K | 111 | 135 | 35 | 0 | ND | ND |
| L | 256 | 285 | 55 | 0 | ND | ND |

$^{a-d}$Determined either by the Temperature Cycle Experiment or the 60° C. Stability Test Temperature Cycle Experiment (5% Cartridge-Life Study)
It consists of two separate experiments (a) and (b):
(a) 5% Accelerator solution (3 g) to 1 g fuel formulation at ambient or 22° C.;
(b) 5% Accelerator solution (3 g) to 1 g fuel formulation at 0° C., then 22° C., then 40° C., then 60° C., and then to 22° C.

For (a) Experiment
(1) To a fuel formulation (about 1.0 gram in weight) is added an accelerator solution (0.15 ml) at ambient or 22° C. Hydrogen is thus generated and measured by a water-displacement method. The time when hydrogen stops evolving after the addition of the accelerator solution is termed as "stop time" and the total volume of hydrogen collected at the stop time called "stop volume".
(2) Record hydrogen volume for the first 5 seconds, stop time and total hydrogen volume (stop volume) at 22° C. as $V_{22}$;

For (b) Experiment
(1) To a fuel formulation about 1.0 gram in weight is added an accelerator solution (0.15 ml) at 0° C. Hydrogen is thus generated, measured by a water-displacement method and recorded every 5 seconds until 1 minute, then every 30 seconds until for 10 minutes;
(2) The same process of (1) is repeated to the same fuel for 22° C., 40° C., 60° C., and 22° C. in the exact order as written;
(3) The final cumulative hydrogen volume at the end of last 22° C. is labeled as $V_{tc}$.
The % latent hydrogen is calculated as: $(V_{tc} \cdot V_{22}) \times 100/V_{tc}$
60° C. Stability Test
(1) To a fuel formulation about 1.0 gram in weight is added an accelerator solution (0.15 ml) at ambient or 22° C. Hydrogen is thus generated and measured by a water-displacement method. The time when hydrogen stops evolving after the addition of the accelerator solution is termed as "stop time" and the total volume of hydrogen collected at the stop time called "stop volume"
(2) Record the stop time and total hydrogen volume (stop volume) at 22° C. as $V_{22}$
(3) The partially spent fuel is then heated at 60° C. after it stops evolution of hydrogen at ambient or 22° C. Additional hydrogen starts to evolve and is collected through the same apparatus until no more hydrogen. It is allowed to cool to ambient temperature.
(4) Use the water collected to adjust the water level in the H tube of the water-displacement setup. Record the final volume of hydrogen collected at 60° C. as $V_{60}$.
(5) % Latent hydrogen=$V_{60} \times 100/(V_{22}+V_{60})$
(e) Determined by the Full Cartridge-Life Study.
Full Cartridge-Life Study
The accelerator solution is dosed at 5% of the total accelerator weight or 0.15 ml to the 1 g-fuel at ambient temperature or 22° C. via a regular delivery method until the fuel is totally spent. This SOP determines the stop time and stop volume for each addition of the accelerator solution or cycle, as well as total hydrogen volume collected when the fuel is completely spent.
The hydrogen yield for each cycle is expressed as wt % hydrogen and is calculated by the following formula: Wt % hydrogen=Cumulative hydrogen weight (g)×100/(F+A)
F: total weight of fuel in grams; A=accelerator solution weight in grams;
Hydrogen weight in grams can be obtained from PV=nRT.
(f) In this procedure, liquid fuel component is delivered at a pre-determined rate (typically μL per minute) onto a fuel composition for a specified period of time. Hydrogen evolved as a function of time, total hydrogen evolved over the entire time period, as well as foam height as a function of time can be measured.
Accurately weigh (to the nearest 0.0001 g) a sample of dry or liquid fuel formulation into a 100 ml graduated cylinder properly equipped with a 24/40 connector to fit the hydrogen evolution assembly. (Water displacement method or wet test meter method) Press start on the pump and start the stopwatch in order to measure the amount of displaced water and foam height at various time intervals. The standard time for a steady-state hydrolysis experimental run is 30-60 minutes. It can be measured up to 6 hours or more based on the flow rate setting, and amounts of solid and liquid fuel compositions used. Maximum foam height and average foam height in mm can be either measured or calculated from the experiment.

Example 13

(Demonstration of Simultaneous Addition)

Fuel: LiH/SBH/CoCl$_2$ (60/34/6) (Composition G).
Accelerator solution: Pure DI water
The solid fuel specified above was coated on one side of a filter paper along a straight line. Water as a liquid accelerator was delivered from the other side of the filter paper by a metering device which moved along the line. Hydrogen generation continued for as long as the metering device was in contact with the filter paper. As soon as the device was off the filter paper, hydrogen evolution stopped. Foaming was not a problem and the fuel utilization was excellent. Also excellent were the start and stop characteristics. All these performances were attributed to the chemistry provided by the fuel compositions of this invention and the simultaneous delivery method.

The invention claimed is:
1. A solid composition comprising:
   (a) from 52% to 80% by weight of at least one metal hydride compound;
   (b) from 15% to 42% by weight of at least one borohydride compound; and
   (c) from 1% to 15% by weight of at least one of: (i) a transition metal halide, and (ii) a transition metal boride.
2. The composition of claim 1 in which said at least one borohydride compound is sodium borohydride, potassium borohydride or a combination thereof; and said at least one metal hydride compound is at least one alkali or alkaline earth metal hydride.
3. The composition of claim 2 in which said at least one catalyst is a halide of Co, Ru, Ni, Fe, Rh, Pd, Os, Ir, Pt, or mixtures thereof.
4. The composition of claim 3 having from 53% to 78% by weight of at least one alkali or alkaline earth metal hydride; from 18% to 40% by weight of sodium borohydride, potassium borohydride or a combination thereof; and from 2% to 12% by weight of a halide of Co, Ru, Ni, Fe, Rh, Pd, Os, Ir, Pt, or mixtures thereof.
5. A method for generating hydrogen from the solid composition of claim 1; said method comprises steps of
   (a) providing a solid composition comprising: (i) from 52% to 80% by weight of at least one metal hydride compound; (ii) from 15% to 42% by weight of at least one borohydride compound; and (iii) from 1% to 15% by weight of at least one of: (1) a transition metal halide, and (2) a transition metal boride; wherein the solid composition is supported on a flexible substrate material; and
   (b) adding water from a water source to the flexible substrate material with relative motion between the water source and the flexible substrate material.
6. The method of claim 5 in which said at least one borohydride compound is sodium borohydride, potassium borohydride or a combination thereof; said at least one metal hydride compound is at least one alkali or alkaline earth metal hydride; and said at least one catalyst is a halide of Co, Ru, Ni, Fe, Rh, Pd, Os, Ir, Pt, or mixtures thereof.
7. The method of claim 6 in which the solid composition comprises from 53% to 78% by weight of at least one alkali or alkaline earth metal hydride; from 18% to 40% by weight of sodium borohydride, potassium borohydride or a combination thereof; and from 2% to 12% by weight of a halide of Co, Ru, Ni, Fe, Rh, Pd, Os, Ir, Pt, or mixtures thereof.
8. The method of claim 7 further comprising acid in the water.

9. A solid composition comprising: from 25% to 65% by weight of sodium borohydride, potassium borohydride or a combination thereof; from 15% to 60% by weight of at least one alkali or alkaline earth metal hydride; from 3% to 9% by weight of a halide of Co, Ru, Ni, Fe, Rh, Pd, Os, Ir, Pt, or mixtures thereof and from 8% to 18% by weight of sodium, lithium or potassium hydroxide, sodium or potassium methoxide, or a combination thereof.

10. The composition of claim 4 in which the alkali or alkaline earth metal hydride is lithium hydride, sodium hydride or a mixture thereof.

11. The composition of claim 10 having from 3% to 10% by weight of the halide of Co, Ru, Ni, Fe, Rh, Pd, Os, Ir, Pt, or mixtures thereof.

12. The composition of claim 11 in which the alkali or alkaline earth metal hydride is lithium hydride.

13. The composition of claim 12 in which the borohydride compound is sodium borohydride.

14. The composition of claim 1 having from 53% to 78% by weight of lithium hydride, sodium hydride or a mixture thereof from 18% to 40% by weight of at least one borohydride compound; and from 2% to 12% by weight of a halide of Co, Ru, Ni, Fe, Rh, Pd, Os, Ir, Pt, or mixtures thereof.

15. The composition of claim 9 in which said at least one metal hydroxide or alkoxide is sodium hydroxide, potassium hydroxide, or a combination thereof, said at least one metal hydride compound is lithium hydride, sodium hydride or a mixture thereof.

16. The composition of claim 15 in which the metal hydride is lithium hydride which is present in an amount from 18% to 60% by weight.

17. The composition of claim 16 having from 10% to 16% by weight of sodium hydroxide, potassium hydroxide, or a combination thereof.

18. The composition of claim 17 having from 4% to 8% by weight of a halide of Co, Ru, Ni, Fe, Rh, Pd, Os, Ir, Pt, or mixtures thereof.

19. The composition of claim 18 in which the borohydride compound is sodium borohydride and the metal hydroxide or alkoxide is potassium hydroxide.

* * * * *